US012794340B2

(12) United States Patent
Hong et al.

(10) Patent No.: US 12,794,340 B2
(45) Date of Patent: Nov. 10, 2026

(54) ANTI-DRIVING INTERFERENCE POWER MODULE

(71) Applicant: MetaPWR Electronics Co., Ltd., Shanghai (CN)

(72) Inventors: Shouyu Hong, Shanghai (CN); Xiaoni Xin, Shanghai (CN); Dong Xu, Shanghai (CN); Hong Jiang, Shanghai (CN)

(73) Assignee: MetaPWR Electronics Co., Ltd., Shanghai (CN)

( * ) Notice: Subject to any disclaimer, the term of this patent is extended or adjusted under 35 U.S.C. 154(b) by 197 days.

(21) Appl. No.: 18/757,430

(22) Filed: Jun. 27, 2024

(65) Prior Publication Data

US 2025/0007384 A1 Jan. 2, 2025

(30) Foreign Application Priority Data

Jun. 29, 2023 (CN) ........................ 202310779771.4

(51) Int. Cl.
*H02M 1/00* (2006.01)
*H02M 7/00* (2006.01)

(52) U.S. Cl.
CPC ......... *H02M 1/0038* (2021.05); *H02M 7/003* (2013.01)

(58) Field of Classification Search
CPC ... H02M 37/003; H02M 3/003; H02M 1/0038
See application file for complete search history.

(56) References Cited

U.S. PATENT DOCUMENTS

2005/0265059 A1* 12/2005 Tracy .................... H02M 7/003 363/132
2018/0056795 A1* 3/2018 Xu ........................ B60L 15/007
2018/0152113 A1* 5/2018 Xu ........................ H02M 7/003
2020/0035656 A1* 1/2020 Miyazaki .............. H02M 7/003
2023/0308027 A1* 9/2023 Mao ...................... H02M 7/003

* cited by examiner

*Primary Examiner* — Harry R Behm
(74) *Attorney, Agent, or Firm* — JCIPRNET

(57) ABSTRACT

The application discloses an anti-driving interference power module which comprises at least one half-bridge power module. The half-bridge power module comprises a first switch device, a second switch device, a DC positive terminal and a DC negative terminal. The DC positive terminal, the first switch device, the second switch device and the DC negative terminal form a filtering loop which is the same as the second driving loop of the second switch device. According to the application, through the coupling design of the detour direction of the circuit, the driving crosstalk generated by the gate is inhibited for the device which does not need to be turned on, and mistaken opening of driving is avoided; and for the device needing to be opened, the turn-on level driven by the gate is enhanced, so that the reliability of the power module is higher.

7 Claims, 12 Drawing Sheets

ANTI-DRIVING INTERFERENCE POWER MODULE

CROSS-REFERENCE TO RELATED APPLICATION

This application claims the priority benefit of China application no. 202310779771.4, filed on Jun. 29, 2023. The entirety of the above-mentioned patent application is hereby incorporated by reference herein and made a part of this specification.

BACKGROUND

Technical Field

With the continuous development of power electronic technology and power electronic devices, the application of power supplies is more and more extensive, and the power and frequency are continuously provided. The requirements and requirements of the power module are higher and higher as one of the cores of the power supply product, and the performance and stability of the product are directly determined by the quality of the power module.

As the switching frequency and the switching rate of the power module are increased, the gate crosstalk generated by the dv/dt leads to increasing the false triggering risk of the power devices in various topologies such as half-bridge, full-bridge and three-phase bridge circuits. In the prior art, there are two methods for suppressing driving interference: one is to reduce the opening rate by increasing the size of the driving resistor in the driving loop, but the performance of the switch device is sacrificed to a certain extent; secondly, capacitance filtering, filtering inductance, magnetic beads and the like are added in the driving loop, so that a certain cost and space can be increased in one aspect, and the performance of a certain device can be sacrificed, so that the method is only a trade-off design.

Therefore, how to suppress driving interference as much as possible while applying capacitive filtering, reduce the required cost and power space, improve the overall performance of the device is an urgent problem to be solved.

SUMMARY

In view of the above, one of the objectives of the present application is to provide an anti-driving interference power module. By means of the coupling design of the winding direction of a circuit, for a device that does not need to be turned on, driving crosstalk generated by a gate electrode is suppressed, and mistaken opening of driving is avoided; and for a device needing to be turned on, the turn-on level driven by the gate electrode is enhanced, so that the reliability of the power module is higher.

A power module capable of resisting driving interference, comprises at least one half-bridge power module. The half-bridge power module comprises a first switch device, a second switch device, a DC positive terminal and a DC negative terminal, wherein the first switch device is electrically connected with the DC positive terminal, the second switch device is electrically connected with the DC negative terminal, the first switch device and the second switch device are connected in series to form a half-bridge arm, and the middle point of the bridge arm of the half-bridge arm is led out to be an SW terminal.

wherein the first switch device and the second switch device are arranged on a substrate;

wherein the second switch device comprises a second switch body, a second source terminal and a second gate terminal;

wherein a bypass direction of a loop formed by the DC positive terminal, the first switch device, the second switch device and the DC negative terminal in sequence is the same as the bypass direction of a loop formed by the second source terminal, the second switch body and the second gate terminal.

The first switch device comprises a first switch body, a first source terminal and a first gate terminal.

wherein a bypass direction of a loop formed by the DC positive terminal, the first switch device, the second switch device and the DC negative terminal in sequence is opposite to a bypass direction of a loop formed by the first source terminal, the first switch body and the first gate terminal.

The half-bridge power module further comprises a filter capacitor, and the filter capacitor and the half-bridge arm are connected in parallel.

The filter capacitor, the second switch body and the first switch body are sequentially arranged on the substrate in sequence, the DC positive terminal and the DC negative terminal are arranged on one side, close to the filter capacitor, of the substrate, and the SW terminal is arranged on the side, close to the first switch body, of the substrate.

The filter capacitor and the first switch device are electrically connected by an electrical connector bypassing the left side of the second switch body, the first source terminal and the first gate terminal are arranged on at least one side of the first switch body, the second source terminal and the second gate terminal are arranged on the right side and the lower side of the second switch body, and the positions of the first gate terminal and the second gate terminal are closer to the positions of the first source terminal and the second source terminal.

The filter capacitor and the first switch device are electrically connected by an electrical connector bypassing the right side of the second switch body, the first source terminal and the first gate terminal are arranged on at least one side of the first switch body, the second source terminal and the second gate terminal are arranged on the left side and the lower side of the second switch body, and the positions of the first gate terminal and the second gate terminal are closer to the positions of the first source terminal and the second source terminal.

The number of the half-bridge power modules is at least two, and the two half-bridge power modules are electrically connected through a DC positive terminal to form a full-bridge module.

The number of the half-bridge power modules is at least three, and the three half-bridge power modules form a three-phase bridge module by electrically connecting the DC positive terminals.

The number of the half-bridge power modules is at least four, and the four half-bridge power modules are electrically connected to form a four-phase bridge module, two full-bridge modules or a three-phase bridge module-half-bridge module assembly structure.

The substrate is a copper-clad ceramic substrate.

The beneficial effects of the application are that:

According to the application, by utilizing the magnetic field coupling effect of the transient current, through the coupling design, driving crosstalk generated by the gate is inhibited for a device which does not need to be turned on, and driving mistaken opening is avoided; and for a device needing to be opened, the turn-on level driven by the gate is enhanced, so that the reliability of the power module is higher, and the driving interference problem of the high-frequency switch can be effectively solved under the condition that the extra cost is not increased.

DESCRIPTION OF THE EMBODIMENTS

Figure 1:
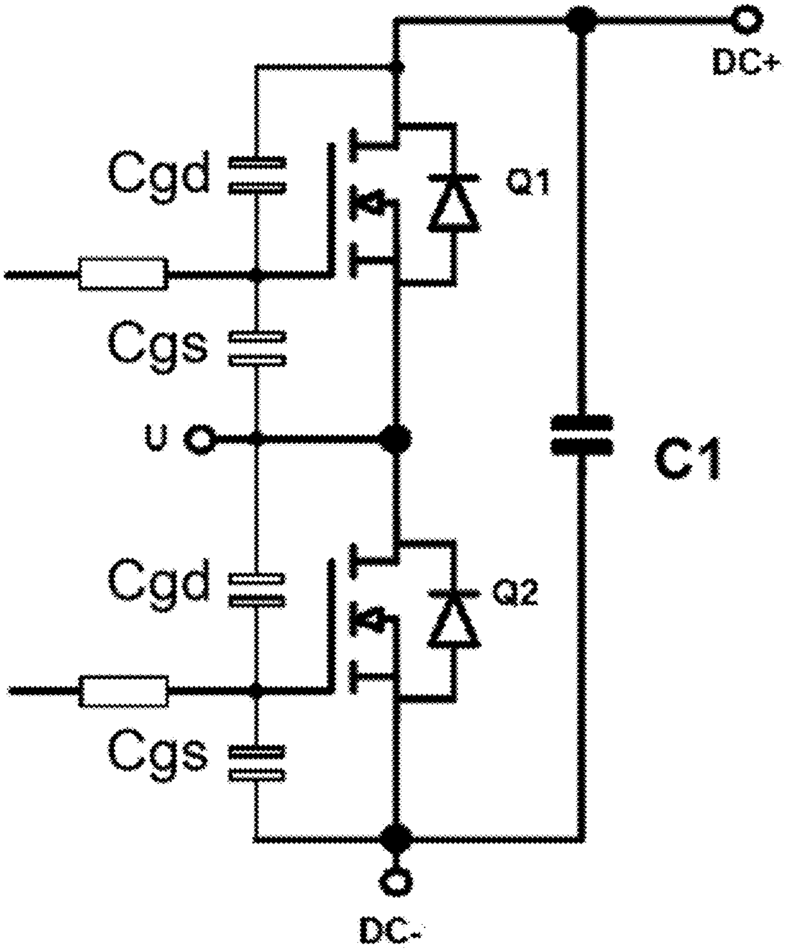
FIG. 1 to FIG. 4 are schematic diagrams of a first embodiment.

The present application discloses various embodiments or examples of implementing the thematic technological schemes mentioned. To simplify the disclosure, specific instances of each element and arrangement are described below. However, these are merely examples and do not limit the scope of protection of this application. For instance, a first feature recorded subsequently in the specification formed above or on top of a second feature may include an embodiment where the first and second features are formed through direct contact, or it may include an embodiment where additional features are formed between the first and second features, allowing the first and second features not to be directly connected. Additionally, these disclosures may repeat reference numerals and/or letters in different examples. This repetition is for brevity and clarity and does not imply a relationship between the discussed embodiments and/or structures. Furthermore, when a first element is described as being connected or combined with a second element, this includes embodiments where the first and second elements are directly connected or combined with each other, as well as embodiments where one or more intervening elements are introduced to indirectly connect or combine the first and second elements.

Embodiment 1

The topological structure of the power module is formed by one or more half-bridge power modules, and one common half-bridge power module comprises two switch devices (a switch device Q1 and a switch device Q2), a DC positive terminal, a DC negative terminal and a filtering capacitor, the switch device Q1 is electrically connected to the DC positive terminal. The switch device Q2 is electrically connected to the DC negative terminal. The two switch devices are connected in series to form a half-bridge arm. The filtering capacitor and the half-bridge arm are connected in parallel. The half-bridge arm comprises an upper bridge arm and a lower bridge arm. The midpoint of the bridge arm of the half-bridge arm is led out to be an SW terminal.

FIG. 1 shows a common circuit diagram of a half-bridge power module adopted by the embodiment, wherein Q1 and Q2 are two switch devices, DC+ and DC− respectively represent a DC positive terminal and a DC negative terminal, C1 is a filter capacitor, and U is an SW terminal of the half-bridge power module; Cgd in the figure is a parasitic capacitance from a gate electrode to a drain electrode, Cgs is the parasitic capacitance from the gate electrode to the source electrode, and due to the existence of the parasitic capacitor, the gate electrode terminal of the switch device responds to the transient current of the surrounding circuit, a crosstalk voltage is generated on the gate electrode, and the original signal potential is changed, so that interference is generated on the gate electrode driving. According to the embodiment of the application, the winding direction of the loop is reasonably set, so that the positive and negative directions of the induced voltage generated by loop coupling are controlled, and the anti-driving interference effect is achieved.

Figure 2:
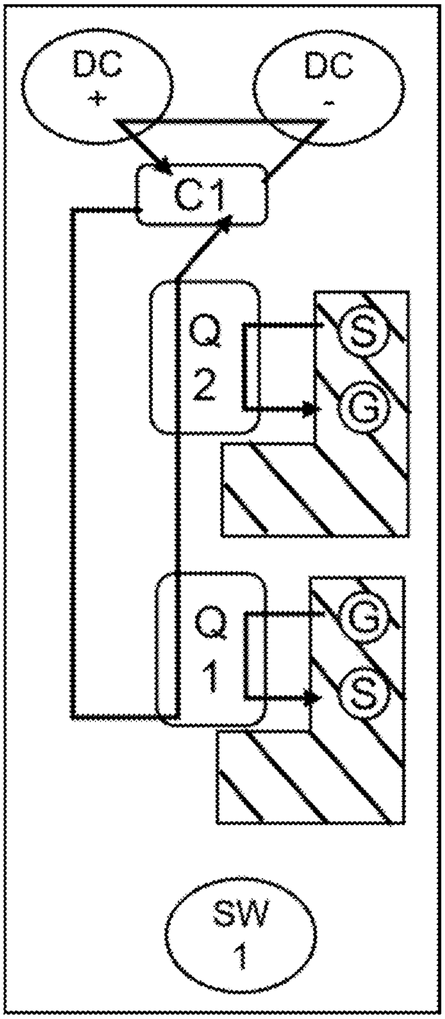

FIG. 2 shows the layout of the half-bridge power module of the embodiment on a DBC (copper-clad ceramic substrate) According to the embodiment, the layout setting of each device is sequentially described from top to bottom according to different levels in FIG. 2:

- The first level is a DC positive terminal and a DC negative terminal, the DC positive terminal is arranged on the left side, and the DC negative terminal is arranged on the right side;
- The second level is a filter capacitor C1, a filter capacitor C1 and a DC positive terminal, the DC negative terminal forms a power input loop, the filter capacitor C1 and the half-bridge arm form a filter loop, and an electrical connection path from the filter capacitor C1 to the switch device Q1 bypasses the left side of the switch device Q2;
- The third level is a switch device Q2 of the lower bridge arm, the driving part corresponding to the switch device Q2 is located in a shadow line area outside the filtering loop (the area below the switch device Q2 and the area of the side close to the DC negative terminal), and the source terminal S is above the gate terminal G, the source terminal S, the main body of the switch device Q2, the gate terminal G and the parasitic capacitor Cgs form a second driving loop;
- The fourth level is a switch device Q1 of the upper bridge arm, the driving part corresponding to the switch device Q1 is located in a shadow line area outside the second loop (the area below the switch device Q1 and the area of the side close to the SW terminal), the gate terminal G is above the source terminal S, the source terminal S, the main body of the switch device Q1, the gate terminal G and the parasitic capacitor Cgs form a first driving loop;
- The fifth level is the SW terminal arranged on the bottom side of the figure after being led out from the midpoint of the bridge arm of the half-bridge arm.

Figure 3:
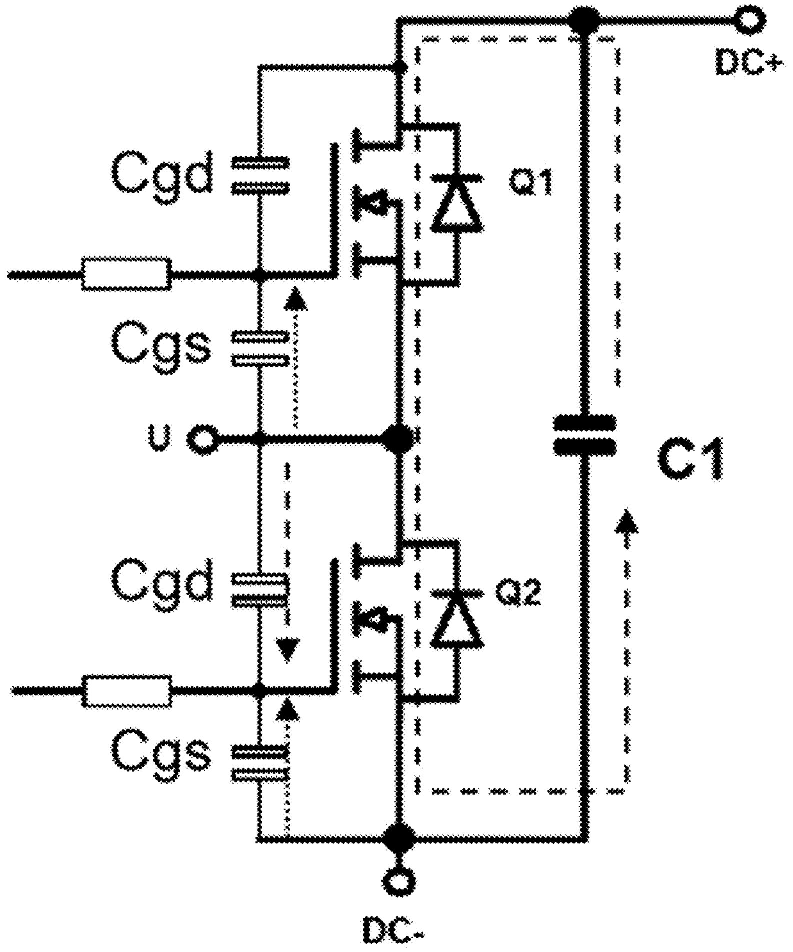
Figure 4:
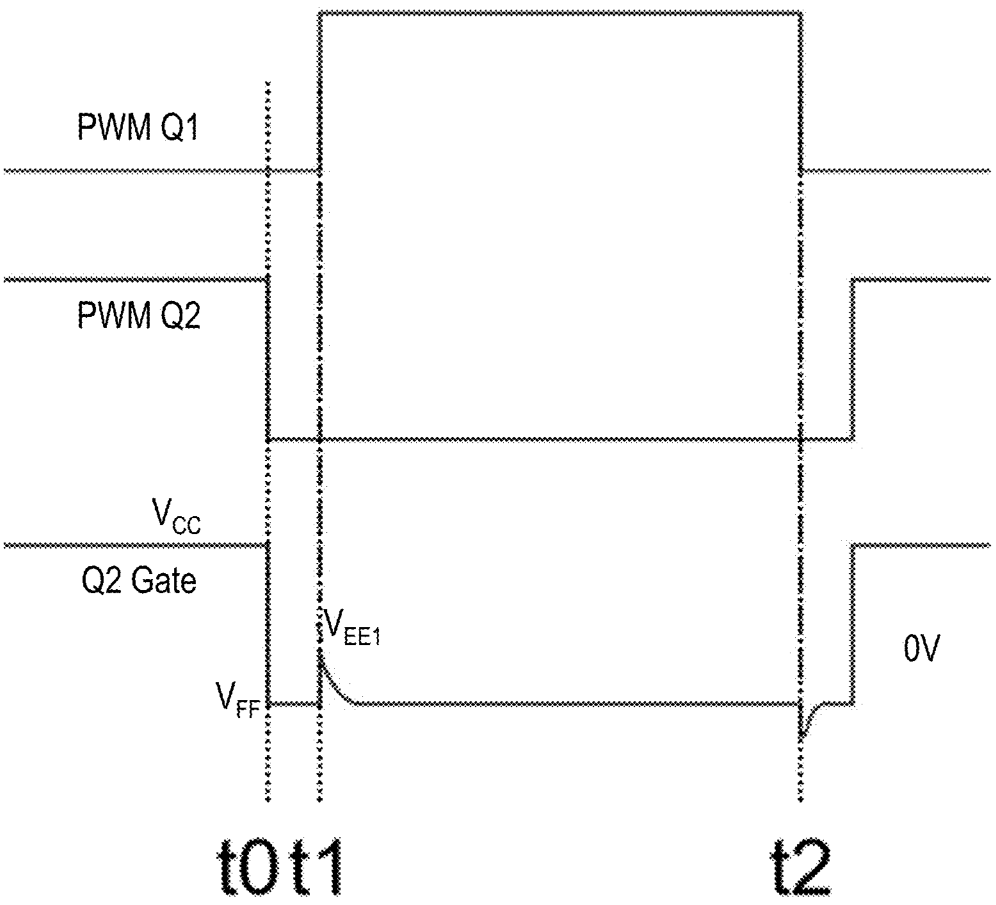

In actual operation, the upper bridge arm and the lower bridge arm of the half-bridge arm are conducted in a staggered complementary form, and FIG. 3 and FIG. 4 show the effect of the circuit coupling between the second driving loop of the switch device Q2 in operation and the circuit of the first driving loop in operation.

At the time T0, the PWM signal switches the switch device Q2 from the ON state to the OFF state;

The interval T0 to T1 is a dead zone interval;

At time t1, the PWM signal turns on the switch device Q1, and the transient current direction (the capacitance discharging direction) of the filtering loop is C1→Q1→Q2. Due to the existence of the parasitic capacitance Cgd and Cgs, the transient current interferes with the gate, which causes the gate of the switch device Q2 to generate an inflow current to generate crosstalk of the positive voltage spike; it should be noted that the positive voltage peak here refers to the first peak of the oscillation attenuation signal in the actual application scene, and since the amplitude of the subsequent oscillation signal except the first peak is attenuated to be smaller than the amplitude of the first peak, the influence of the positive voltage peak is negligible compared with that of the first peak.

After the circuit coupling direction of the embodiment is set, the transient current of the filtering loop generates a coupling voltage from the source electrode to the gate electrode for the second driving loop, the effect of offsetting and suppressing the forward voltage peak is achieved for the switch device Q2, the coupling voltage from the gate electrode to the source electrode is generated for the first driving loop, and the switch device Q1 is positively enhanced.

At time t2, the PWM signal turns off the switch device Q1, and also due to the existence of the parasitic capacitance Cgd and Cgs, the transient current interferes with the gate, so that the gate of the switch device Q2 generates an outflow current, and crosstalk of the negative pressure peak is generated;

After the circuit coupling direction of the embodiment is set, the transient current of the filtering loop generates a coupling voltage from the gate electrode to the source electrode for the second driving loop, the effect of offsetting and suppressing the negative voltage peak is achieved for the switch device Q2, the coupling voltage from the source electrode to the gate electrode is generated for the first driving loop, and the effect of reinforcing and turning off the switch device Q1 is achieved.

The half cycle of the switch device Q2 from on to off is similar to the half cycle of the switch device Q1, and details are not described herein again.

Embodiment 2

Figure 5:
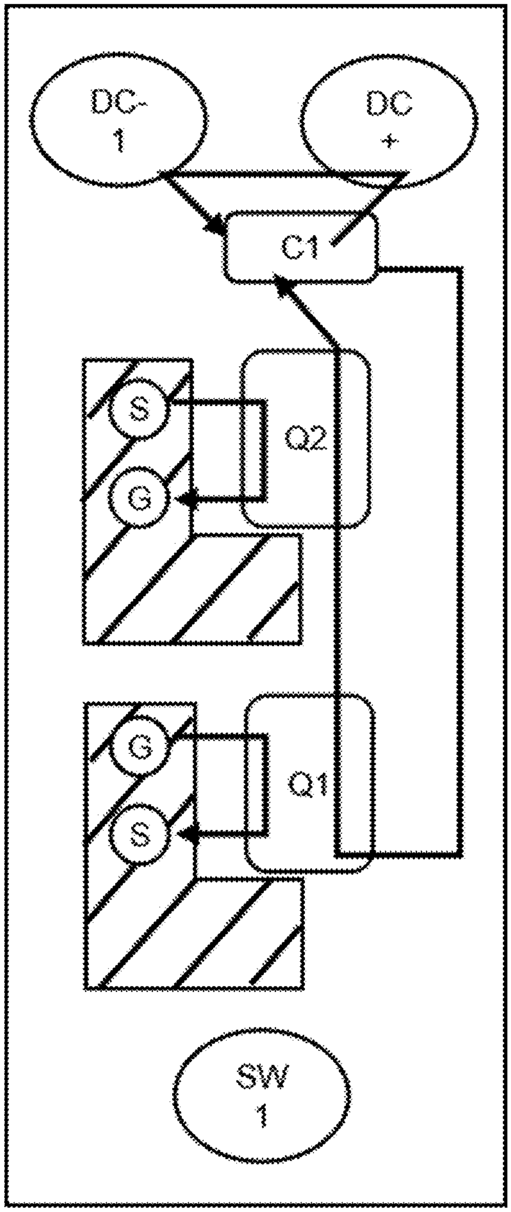
FIG. 5 is a schematic diagram of Embodiment 2.

The embodiment of the application differs from the first embodiment in that the layout of the half-bridge power module on the DBC (copper-clad ceramic substrate) is arranged symmetrically left and right. As shown in FIG. 5, specifically:

The DC positive terminal is arranged on the right side, and the DC negative terminal is arranged on the left side;

An electrical connection path from the filter capacitor C1 to the switch device Q1 is bypassed from the right side of the switch device Q2;

A driving part corresponding to the switch devices Q2 and Q1 is located in a shadow line area on the outer side of the filtering loop respectively According to the embodiment of the application, the outer side shading line area faces leftwards.

Due to the fact that the mirror surfaces are symmetrically arranged, the detour direction of each loop in the embodiment is opposite to that of the first embodiment, so that the coupling effect of the first driving loop and the filtering loop and the coupling effect of the second driving loop and the filtering loop are still the same, and the embodiment has the same technical effect as the first embodiment, and details are not described herein again.

Embodiment 3

One half-bridge power module of the first embodiment is referred to as an A module, one half-bridge power module of the second embodiment is referred to as a B module, and the A module and the B module can form a full bridge, a three-phase bridge or other power modules including more half-bridge power modules through mutual combination of the same module or the heterogeneous modules.

Figure 6:
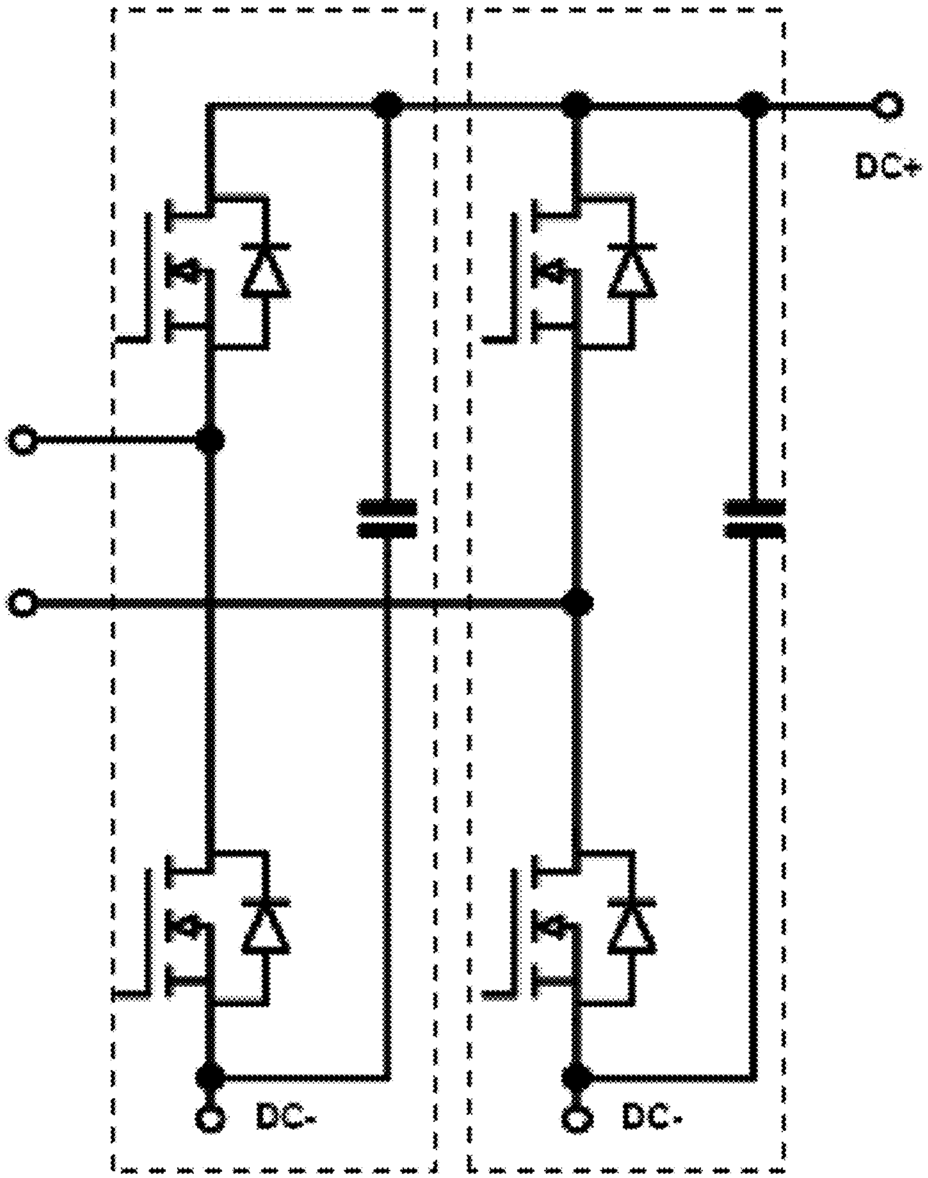
FIG. 6 to FIG. 12 are schematic diagrams of Embodiment 3.
Figure 7:
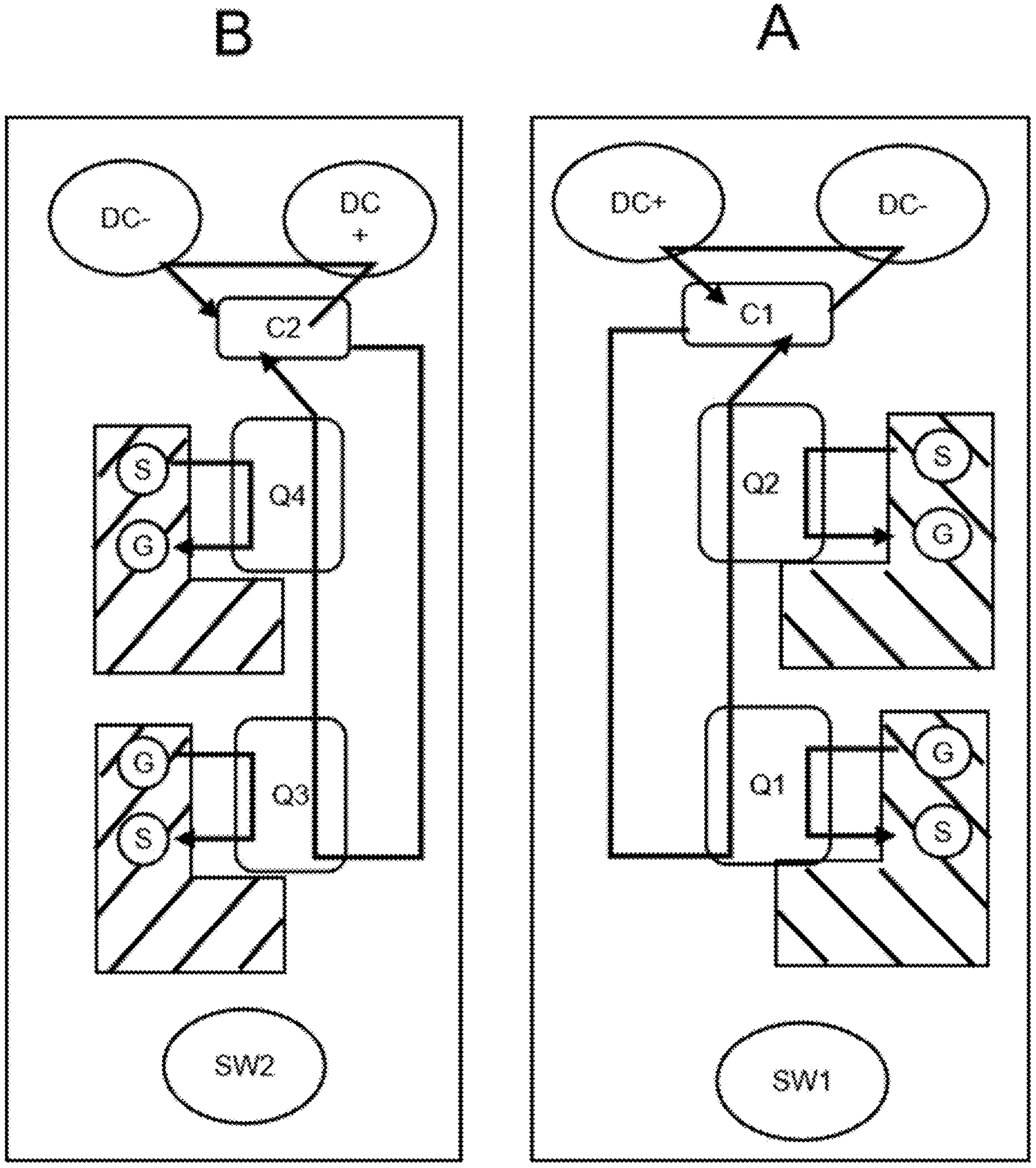

FIG. 6 and FIG. 7 show the structure of a full-bridge power module, and the full-bridge power module is composed of an A module and a B module. FIG. 6 is a circuit diagram, wherein a part of the dotted line frame shows a circuit of a half-bridge power module, and the A module and the B module are electrically connected to form a common DC positive terminal. FIG. 7 is a schematic layout diagram, wherein Q1 and Q2 are two switch devices of the A module, Q3 and Q4 are two switch devices of the B module, C1 and C2 are filter capacitors of the A module and the B module respectively, and SW1 and SW2 are SW terminals of the A module and the B module respectively. The DC positive terminals of the two modules in the figure are arranged adjacent so as to be electrically connected. In a preferred embodiment, the two DC negative terminals of the full-bridge power module are independently arranged inside, and are electrically connected by means of other circuits external to the full-bridge power module (for example, a circuit on a system mainboard) to achieve the complete function thereof.

Figure 8:
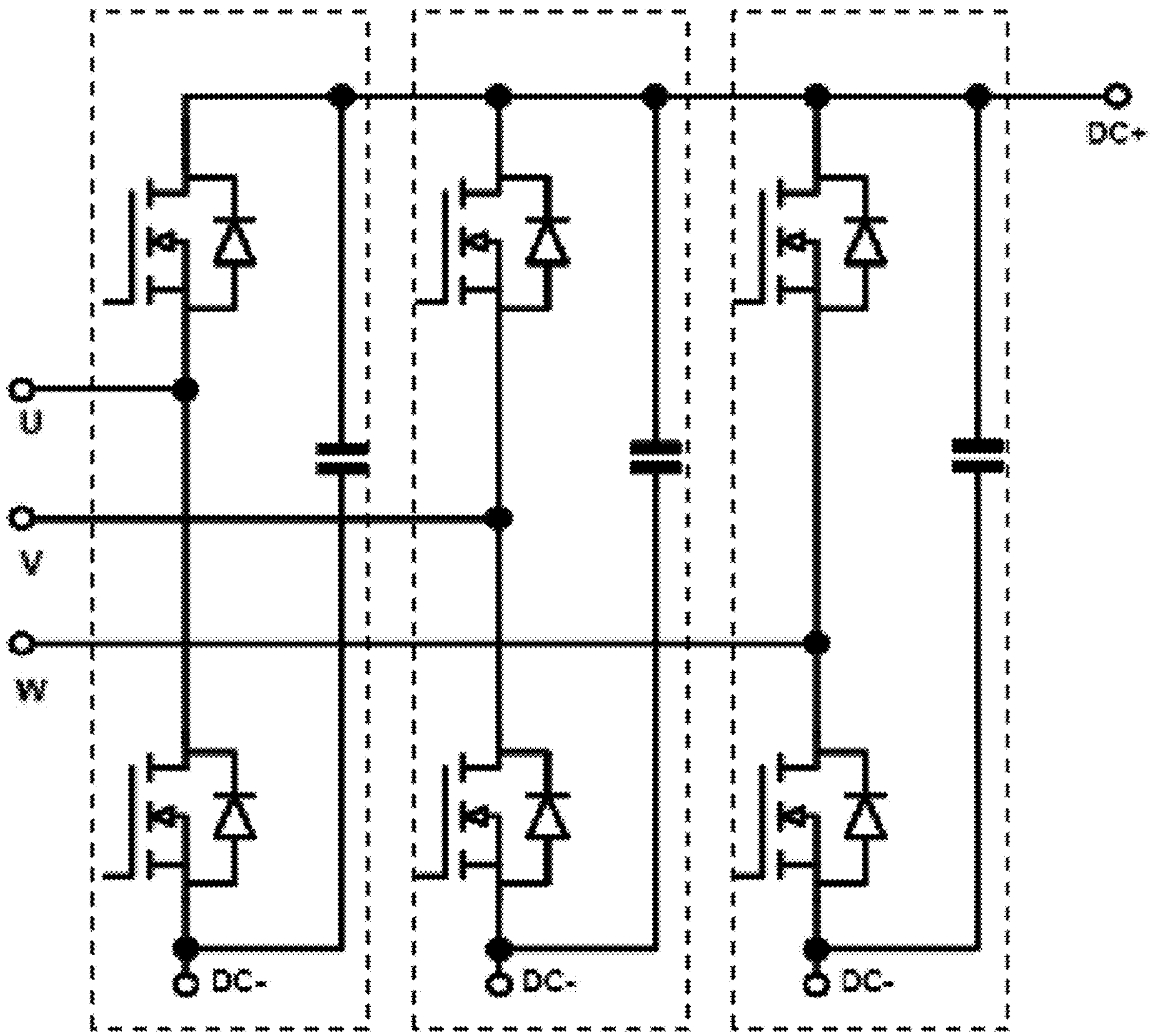
Figure 9:
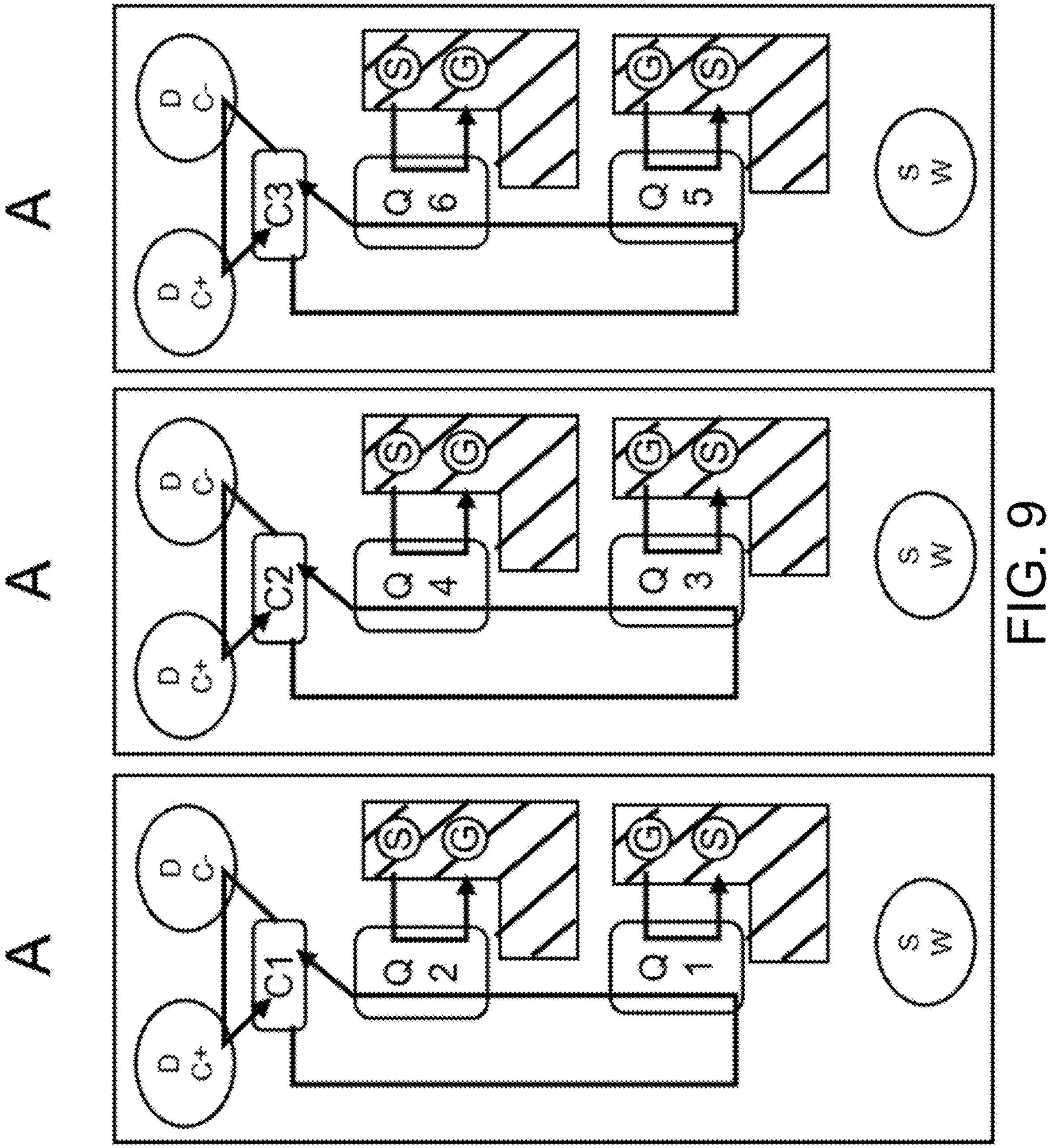
Figure 10:
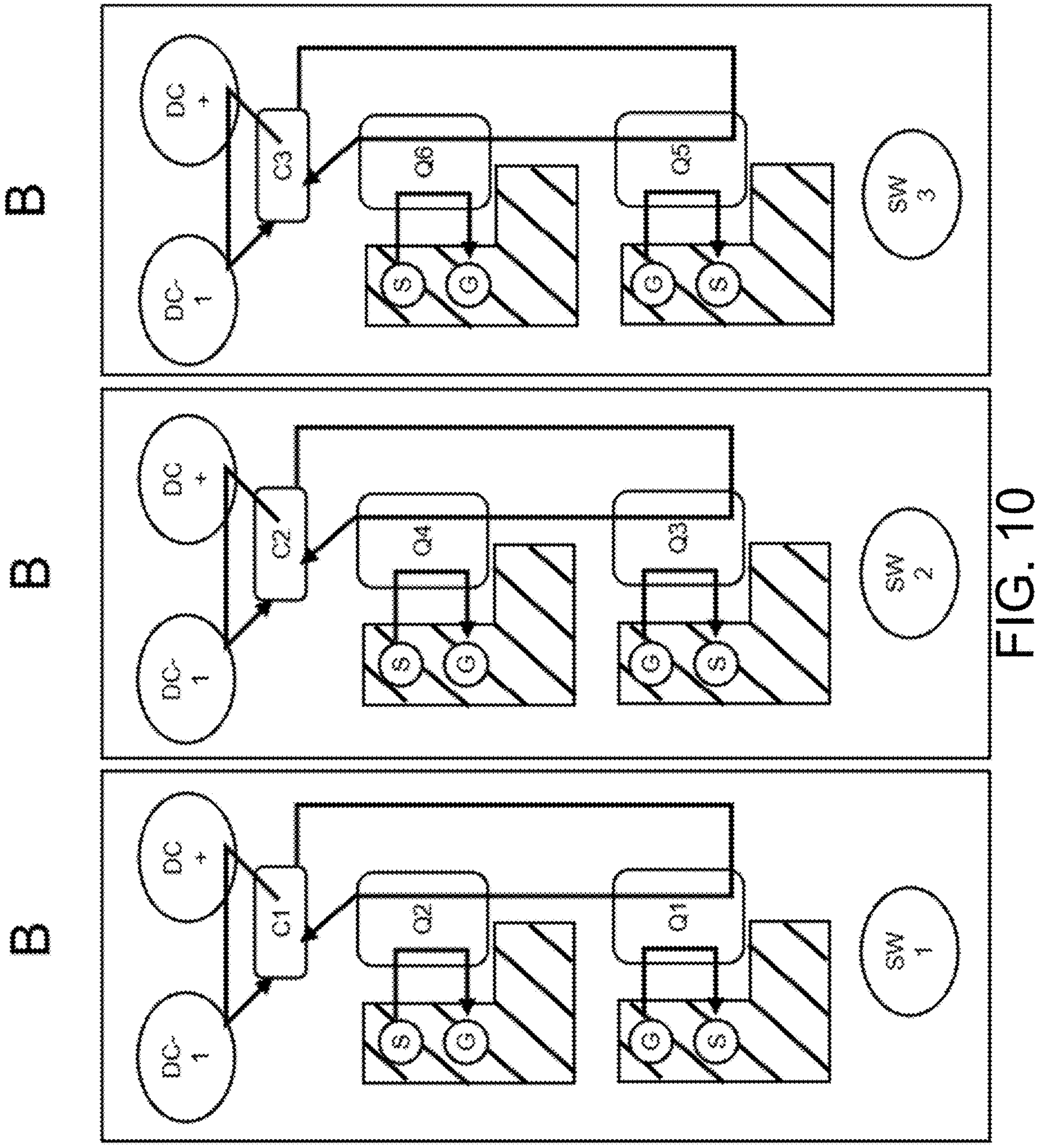
Figure 11:
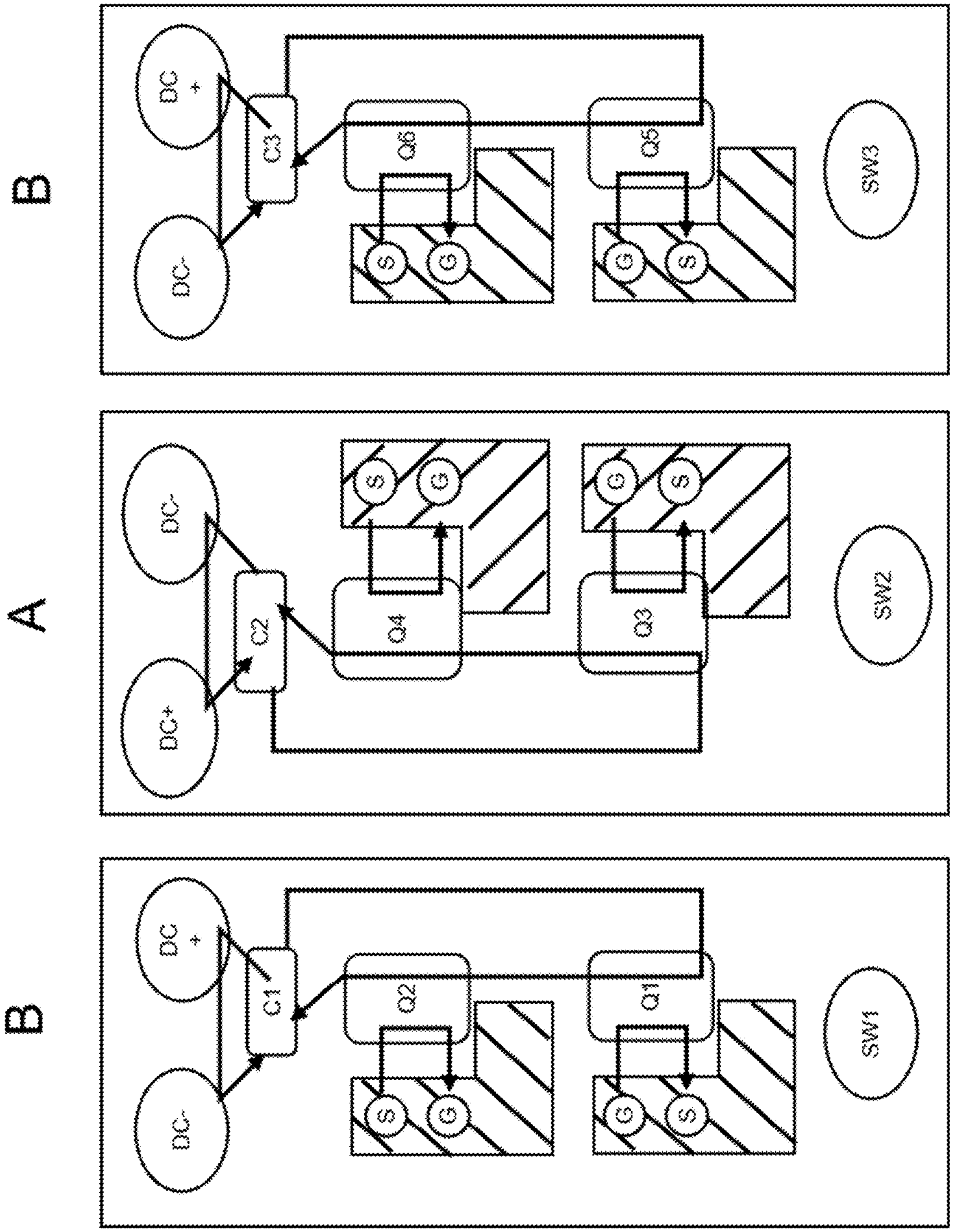

FIG. 8 to FIG. 11 show the structure of the three-phase bridge module, and the three-phase bridge module can be formed by mixing three A modules or three B modules or an A module B module. FIG. 8 is a circuit diagram, wherein a part of a dashed line frame shows a circuit of a half-bridge power module, three half-bridge power modules are electrically connected to form a common DC positive terminal, and SW terminals of the three half-bridge power modules are three-phase U, V and W terminals in the figure. In a preferred embodiment, the three DC negative terminals of the three-phase bridge module are independently arranged inside, and the three DC negative terminals of the three-phase bridge module are electrically connected through other circuits outside the three-phase bridge module (for example, a circuit on a system mainboard) to realize the complete function. FIG. 9 to FIG. 11 are schematic layout diagrams. C 1-Q 1-Q 2, C 2-Q 3-Q 4, C 3-Q 5-Q 6 are respectively device groups of each half-bridge power module, FIG. 9 is a combination of three A modules, FIG. 10 is a combination of three B modules, FIG. 11 is a combination of three modules in the form of BAB, and in some other embodiments, the combination can also be performed in other forms, and details are not described herein again.

Figure 12:
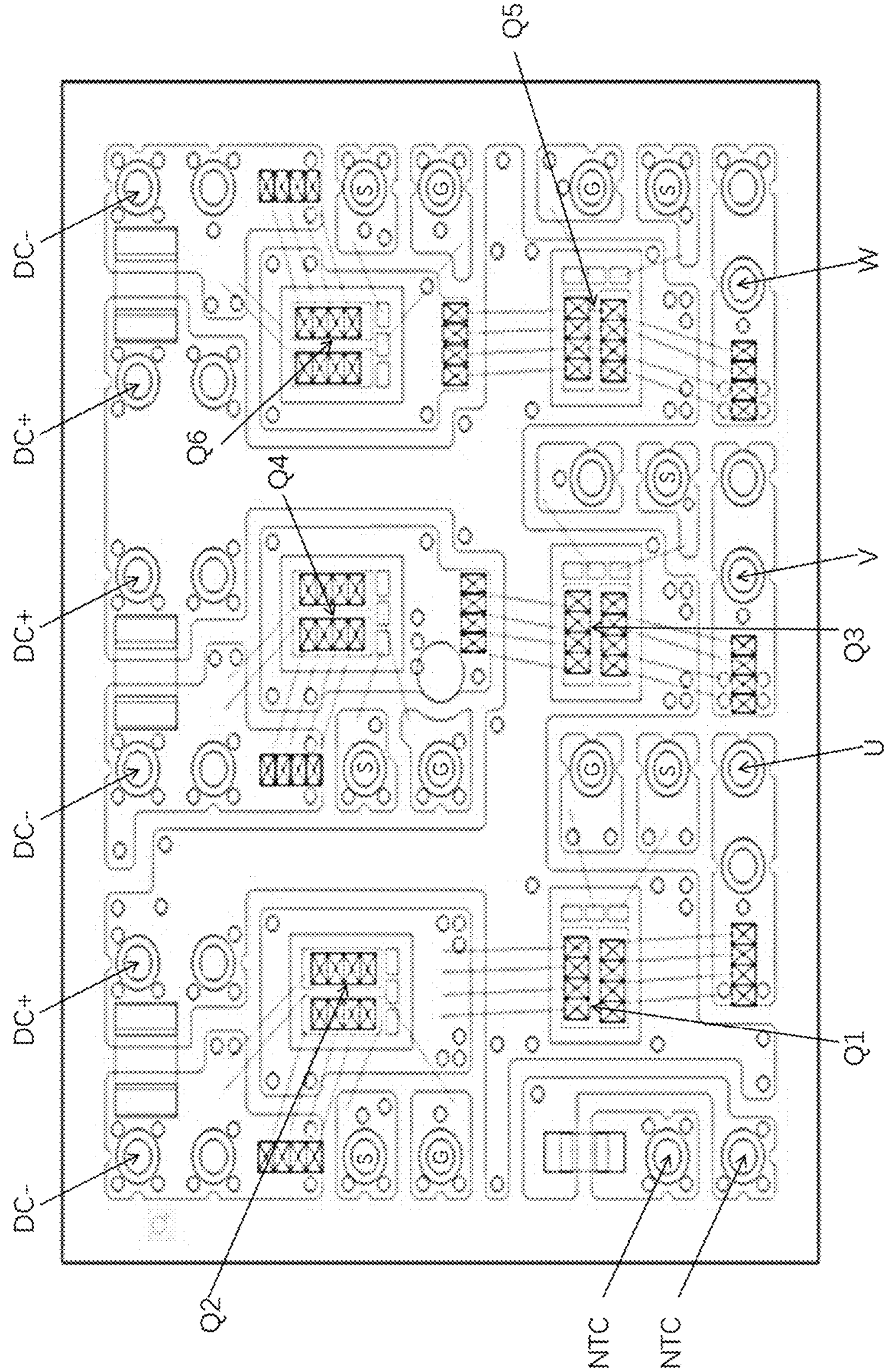

In a preferred embodiment, according to the requirements of actual layout, the layout positions of the driving parts corresponding to the switch devices of the same half-bridge power module can be respectively located on the left side and the right side of the half-bridge power module, that is, the layout position of the driving part of the first switch device is adjusted to enable the overall layout to leave a layout space which can be used for setting other functional areas at the lower left corner. A circuit board layout design of this embodiment is shown in FIG. 12. In this embodiment, other functional areas are used to set a thermosensitive device (NTC). On the other hand, the B module and the A module adjacent to the DC positive terminal can share the copper foil (the electrical connector from the DC positive terminal to the first switch device Q3/Q5).

In a preferred embodiment, the embodiment comprises four half-bridge power modules, the four half-bridge power modules can work independently of each other, or the DC positive terminal can be electrically connected to form a four-phase bridge module, two full-bridge modules or a three-phase bridge module-half-bridge module assembly structure.

Those skilled in the art can easily understand that the above are only preferred embodiments of the present disclosure, and are not intended to limit the present disclosure. Any modifications, equivalent replacements and improvements made within the spirit and principles of the present disclosure, etc., should be included within the protection scope of the present disclosure.

What is claimed is:

1. A power module capable of resisting driving interference, comprising at least one half-bridge power module, wherein the at least one half-bridge power module comprises a first switch device, a second switch device, a DC positive terminal and a DC negative terminal, the first switch device is electrically connected with the DC positive terminal, the second switch device is electrically connected with the DC negative terminal, the first switch device and the second switch device are connected in series to form a half-bridge arm, and a middle point of the bridge arm is led out to be an SW terminal, wherein the first switch device and the second switch device are arranged on a substrate, wherein the second switch device comprises a second switch body, a second source terminal and a second gate terminal, wherein a bypass direction of a loop formed by the DC positive terminal, the first switch device, the second switch device and the DC negative terminal in sequence is the same as the bypass direction of a loop formed by the second source terminal, the second switch body and the second gate terminal, wherein the first switch device comprises a first switch body, a first source terminal and a first gate terminal, wherein the bypass direction of the loop formed by the DC positive terminal, the first switch device, the second switch device and the DC negative terminal in sequence is opposite to a bypass direction of a loop formed by the first source terminal, the first switch body and the first gate terminal, wherein the at least one half-bridge power module further comprises a filter capacitor, wherein the filter capacitor and the half-bridge arm are connected in parallel, wherein the filter capacitor, the second switch body and the first switch body are sequentially arranged on the substrate in sequence, the DC positive terminal and the DC negative terminal are arranged on one side, close to the filter capacitor, of the substrate, and the SW terminal is arranged on another side, close to the first switch body, of the substrate, wherein the filter capacitor and the first switch device are electrically connected by an electrical connector bypassing the second switch body, and positions of a first gate terminal of the first switch device and a second gate terminal of the second switch device are closer to positions of a first source terminal of the first switch device and a second source terminal of the second switch device.

2. The power module of claim 1, wherein the filter capacitor and the first switch device are electrically connected by an electrical connector bypassing a left side of the second switch body, a first source terminal and a first gate terminal of the first switch device are arranged on at least one side of the first switch body, the second source terminal and the second gate terminal are arranged on a right side and a lower side of the second switch body, and positions of the first gate terminal and the second gate terminal are closer to positions of the first source terminal and the second source terminal.

3. The power module of claim 1, wherein the filter capacitor and the first switch device are electrically connected by an electrical connector bypassing a right side of the second switch body, the first source terminal and the first gate terminal are arranged on at least one side of the first switch body, the second source terminal and the second gate terminal are arranged on a left side and a lower side of the second switch body, and positions of the first gate terminal and the second gate terminal are closer to positions of the first source terminal and the second source terminal.

4. The power module of claim 1, wherein a number of the at least one half-bridge power module is at least two, and the at least two half-bridge power modules are electrically connected through the DC positive terminal to form a full-bridge module.

5. The power module of claim 1, wherein a number of the at least one half-bridge power module is at least three, and the at least three half-bridge power modules form a three-phase bridge module by electrically connecting the DC positive terminals.

6. The power module of claim 1, wherein a number of the at least one half-bridge power modules is at least four, and the at least four half-bridge power modules are electrically connected to form a four-phase bridge module, two full-bridge modules or a three-phase bridge module-half-bridge module assembly structure.

7. The power module of claim 1, wherein the substrate is a copper-clad ceramic substrate.

* * * * *